(12) United States Patent
Kanechika et al.

(10) Patent No.: US 11,629,838 B2
(45) Date of Patent: Apr. 18, 2023

(54) LIGHT EMITTING UNIT, AND LAMP DEVICE HAVING A RADAR DEVICE COVERED WITH LIGHT GUIDE

(71) Applicant: Stanley Electric Co., Ltd., Tokyo (JP)

(72) Inventors: Masayuki Kanechika, Tokyo (JP); Takashi Sato, Tokyo (JP); Minoru Yamaguchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/785,906

(22) PCT Filed: Dec. 10, 2020

(86) PCT No.: PCT/JP2020/046078
§ 371 (c)(1),
(2) Date: Jun. 16, 2022

(87) PCT Pub. No.: WO2021/125047
PCT Pub. Date: Jun. 24, 2021

(65) Prior Publication Data
US 2023/0018354 A1  Jan. 19, 2023

(30) Foreign Application Priority Data

Dec. 20, 2019 (JP) .............................. JP2019-230692
Jun. 24, 2020 (JP) .............................. JP2020-109193

(51) Int. Cl.
*B60Q 1/00* (2006.01)
*F21S 43/245* (2018.01)
*F21S 43/237* (2018.01)

(52) U.S. Cl.
CPC .......... *F21S 43/245* (2018.01); *B60Q 1/0023* (2013.01); *F21S 43/237* (2018.01)

(58) Field of Classification Search
CPC .......... B60Q 3/62; B60Q 1/0023; F21S 41/24
See application file for complete search history.

(56) References Cited

U.S. PATENT DOCUMENTS

| 10,017,631 B2 | 7/2018 | Yun et al. |
| 2008/0180965 A1 | 7/2008 | Nakamura et al. |

(Continued)

FOREIGN PATENT DOCUMENTS

| DE | 102018111438 A1 | 11/2019 |
| EP | 4023495 A1 | 7/2022 |

(Continued)

OTHER PUBLICATIONS

International Search Report and Written Opinion dated Feb. 9, 2021, received for PCT Application PCT/JP2020/046078, filed on Dec. 10, 2020, 8 pages including English Translation.

(Continued)

*Primary Examiner* — Robert J May
(74) *Attorney, Agent, or Firm* — Xsensus LLP

(57) ABSTRACT

A lamp device suppresses attenuation and reflection of a radar wave attributable to a light guide body, does not change an electromagnetic wave radiation pattern, and does not impair a radar function. The lamp device includes: a light guide body covering a part of an electromagnetic wave radiation surface of a radar device; and a light source, wherein, when the thickness of the light guide body is denoted by TG, and the wavelength of a radiated electromagnetic wave from the radar device in the light guide body is denoted by $\lambda d$, TG is set such that $TG < \lambda d/2$ is satisfied when the reflection loss of the light guide body with respect to the radiated electromagnetic wave is below a transmission loss, and a reflection loss is −10 dB or less when the reflection loss is equal to or more than a transmission loss.

15 Claims, 4 Drawing Sheets

(56) References Cited

U.S. PATENT DOCUMENTS

2017/0155190 A1   6/2017   Kawaguchi et al.
2017/0158111 A1   6/2017   Zawacki et al.

FOREIGN PATENT DOCUMENTS

| JP | 2006-140956 A | 6/2006 |
|---|---|---|
| JP | 4842161 B2 | 12/2011 |
| JP | 2017-507211 A | 3/2017 |
| JP | 2019-007776 A | 1/2019 |
| WO | 2018/121855 A1 | 7/2018 |
| WO | 2020/173965 A1 | 9/2020 |

OTHER PUBLICATIONS

Extended European Search Report issued Dec. 2, 2022 in corresponding European Patent Application No. 20903225.9, 14 pages.

LIGHT EMITTING UNIT, AND LAMP DEVICE HAVING A RADAR DEVICE COVERED WITH LIGHT GUIDE

CROSS-REFERENCE TO RELATED APPLICATIONS

The present application is based on PCT filing PCT/JP2020/046078, filed Dec. 10, 2020, which claims priority to JP 2019-230692, filed Dec. 20, 2019, and JP 2020-109193, filed Jun. 24, 2020, the entire contents of each are incorporated herein by reference.

TECHNICAL FIELD

The present invention relates to a light emitting unit and a lamp device, and more particularly to a light emitting unit for a radar device mounted on a vehicle and a vehicle lamp device that includes a radar device.

BACKGROUND ART

For driver assistance and automated driving, various sensors such as cameras, LiDAR (Light Detection and Ranging), and millimeter wave sensors are used in addition to acceleration sensors and GPS sensors.

In particular, millimeter wave radars are not affected by environmental factors such as nighttime and backlighting, and bad weather such as heavy fog, rainfall and snowfall, and maintain high environmental resistance performance. In addition, millimeter wave radars can directly detect the distance to and the direction of an object and the speed relative to the object. Thus, millimeter wave radars are characterized by having the capability of detecting even a short-distance object at high speed and with high accuracy.

There has been proposed a vehicle light fixture in which a millimeter wave radar is mounted in a light chamber and a light guide member that transmits millimeter waves is provided between a front cover and the millimeter wave radar (e.g., Patent Literature 1).

CITATION LIST

Patent Literature

Patent Literature 1: Japanese Patent No. 4842161

SUMMARY OF INVENTION

Technical Problem

However, when a light guide member is placed in front of a millimeter wave radar, the electromagnetic waves emitted from the millimeter wave radar are reflected and absorbed by the light guide member due to the influences of the relative permittivity or the dielectric loss tangent of the light guide member, causing the radiated power of the radiated electromagnetic waves to be reduced, with resultant significant deterioration of the detection performance of the millimeter wave radar.

Therefore, although an external appearance can be improved by, for example, making the millimeter wave radar invisible from the outside by using a light guide member (a light guide rod or the like), which is normally used for an automobile headlight, this has been a cause of loss of a radar function.

The present invention has been made in view of the above, and an object of the invention is to provide a light emitting unit which suppresses the attenuation and reflection of a radar wave, does not change a radar wave radiation pattern, and does not adversely affect a radar function even when the light emitting unit is placed in front of the radar.

The present invention has been made in view of the above, and an object of the invention is to provide a lamp device which can suppress the attenuation and reflection of a radar wave attributable to a light guide body (light guide member), does not change an electromagnetic wave radiation pattern, and does not impair a radar function even when a DRL (Daytime Running Lamp) or a turn lamp is placed in front of a radar.

Another object of the invention is to provide a lamp device that mainly suppresses a drop in the reception sensitivity of a radar caused by a thermal noise from a light source that supplies light to a light guide body.

Solution to Problem

A lamp device according to an embodiment of the present invention is a lamp device having a lighting unit and a radar device, the lamp device including:

a light guide body that covers at least a part of an electromagnetic wave radiation surface of the radar device; and a light source that supplies light to the light guide body, wherein, in the case where a thickness of the light guide body is denoted by TG, and a wavelength of a radiated electromagnetic wave from the radar device in the light guide body is denoted by $\lambda d$, TG is set such that $TG < \lambda d/2$ is satisfied when a reflection loss of the light guide body with respect to the radiated electromagnetic wave is below a transmission loss, and a reflection loss is $-10$ dB or less when a reflection loss is equal to or more than a transmission loss.

A light emitting unit according to another embodiment of the present invention includes:

a light guide body that is placed in front of an electromagnetic wave radiation surface of a radar device and configured to cover at least a part of the electromagnetic wave radiation surface; and a light source that supplies light to the light guide body, wherein, in the case where a thickness of the light guide body is denoted by TG, and a wavelength of a radiated electromagnetic wave from the radar device in the light guide body is denoted by $\lambda d$, TG is set such that $TG = n \times \lambda d/2$ (n being a natural number) is satisfied when a reflection loss of the light guide body with respect to the radiated electromagnetic wave is equal to or more than a transmission loss, and a reflection loss is $-10$ dB or less when a reflection loss is equal to or more than a transmission loss.

A lamp device according to yet another embodiment of the present invention is a lamp device having a lighting unit, a radar device and a light-transmitting cover, including:

a light guide body that is placed between the light-transmitting cover and an electromagnetic wave radiation surface of the radar device and covers at least a part of the electromagnetic wave radiation surface of the radar device; and a light source that supplies light to the light guide body, wherein a radiation surface correspondence area, which is an area of the light-transmitting cover overlapping the electromagnetic wave radiation surface as viewed from a direction perpendicular to the electromagnetic wave radiation surface, the light guide body, and the electromagnetic wave radiation surface are placed in such a manner as to be parallel to each other, the radiation surface correspondence area of the light-transmitting cover and the light guide body are configured to be sized and placed to cover the entire surface of the electromagnetic wave radiation surface as viewed from a direction perpendicular to the electromagnetic wave radiation surface, a thickness TK of the radiation surface correspondence area of the light-transmitting cover is set such that a reflection loss of the electromagnetic wave incident upon the radiation surface correspondence area of the light-transmitting cover is −10 dB or less, a thickness TG of the light guide body is set such that a reflection loss of the electromagnetic wave incident upon the light guide body is −10 dB or less, and an interval C1 between the radiation surface correspondence area and the light guide body is set such that a reflection loss of the electromagnetic wave incident upon the radiation surface correspondence area and the light guide body is −10 dB or less.

DESCRIPTION OF EMBODIMENTS

Figure 1:
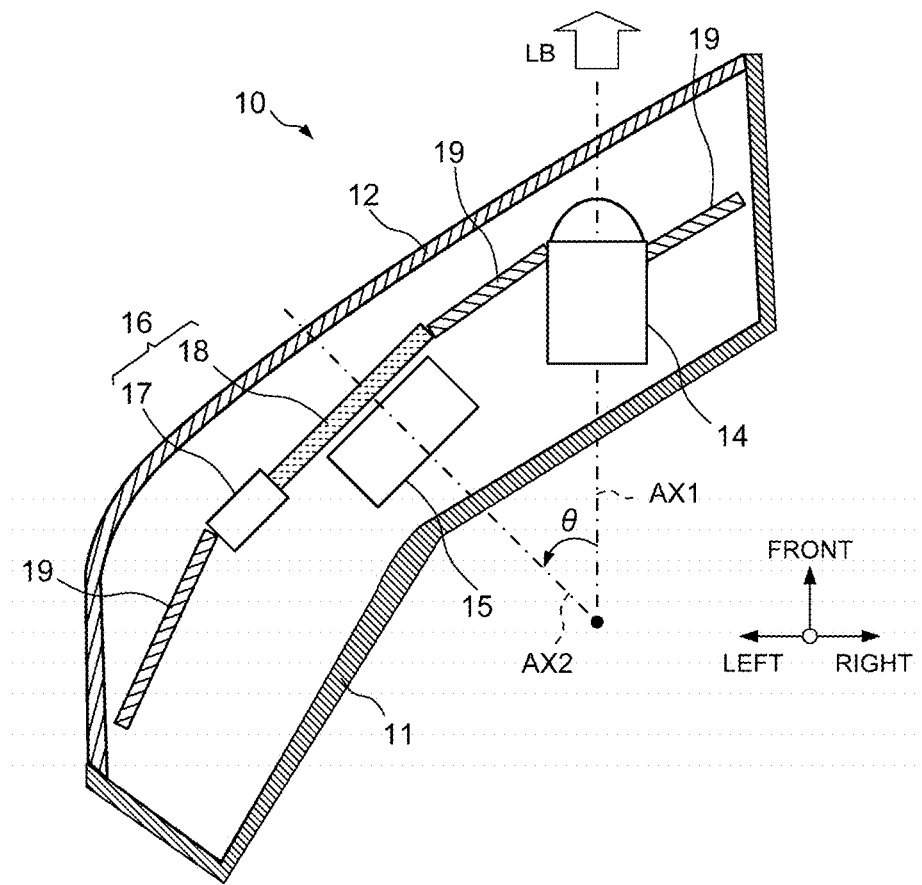
FIG. 1 is a diagram schematically illustrating an example of the internal structure of a lamp device according to a first embodiment of the present invention.

In the following, preferred embodiments of the present invention will be described, but these may be modified or combined as appropriate and then applied. Further, in the following description and the accompanying drawings, substantially the same or equivalent parts will be described with the same reference numerals.

FIG. 1 is a diagram schematically illustrating an example of the internal structure of a lamp device 10 of a first embodiment according to the present invention.

The lamp device 10 is, for example, a headlight mounted on a vehicle such as an automobile. FIG. 1 schematically illustrates the section in a horizontal plane (or a plane parallel to a road surface) of the lamp device 10 mounted on the front left of the vehicle (left headlight) when viewed from above.

In the lamp device 10, a lamp enclosure (housing) is composed of a base body 11 and a transparent cover 12 held on the base body 11. The lamp enclosure includes therein a headlight unit 14, which is a lighting (light source) unit, a millimeter wave radar unit (radar device) 15, a light emitting unit 16, and at least one extension 19.

The headlight unit 14 has a light source such as an LED (Light Emitting Diode), and a lens or a reflector for distributing and irradiating the light from the light source. The headlight unit 14 is placed along an optical axis AX1 and is provided such that irradiation light LB of a low beam (passing beam) and a high beam (driving beam) is irradiated in a forward (FRONT in the drawing) direction.

In the present specification, the lighting unit is not limited to a headlight light source, but refers to a light source having a purpose or a function of emitting light toward the outside, such as a taillight, a backlight or the like.

The millimeter wave radar unit 15 has a transmitting antenna and a receiving antenna on a transmitting/receiving surface (electromagnetic wave radiation surface) 15S thereof. The millimeter wave radar unit 15 radiates electromagnetic waves (millimeter waves) from the transmitting antenna and receives, by the receiving antenna, the reflection waves reflected by an object. A received signal is subjected to signal processing by a controller such as an ECU (Electronic Control Unit), which is not illustrated, so as to detect the distance to, the angle, and the speed of the object. For the millimeter wave radar unit 15, millimeter waves in, for example, a 76 to 81 GHz band, especially millimeter waves in a 79 GHz band, are used; however, the frequency band is not limited thereto.

A normal-line direction AX2 of the antenna surface (electromagnetic wave radiation surface) 15S of the millimeter wave radar unit 15 is set to incline by an angle θ (45° in the present embodiment) in the outside direction of the vehicle (i.e., the left direction in the case of a left headlight) with respect to the optical axis AX1 of the headlight unit 14 so as to be capable of performing detection from a front direction to a side direction.

The extensions 19 are design components provided to reflect light, or make it difficult for an internal structure or the like to be visually recognized from the outside.

As illustrated in FIG. 1, the light emitting unit 16 has a light source 17 and a light guide body 18 composed of at least one light guide member that guides the light from the light source 17. The light emitting unit 16 functions as a DRL (Daytime Running Lamp) or a turn lamp. The light source 17 has, for example, an LED, an incandescent light bulb, or the like and supplies the light thereof to the light guide body 18.

Figure 2:
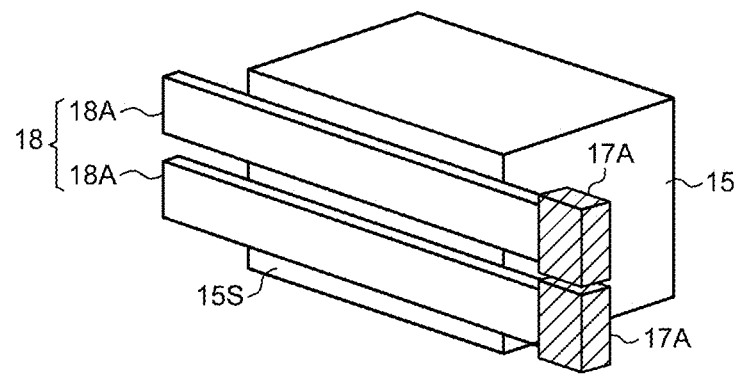
FIG. 2 is a perspective view illustrating the placement of a millimeter wave radar unit 15 and a light emitting unit 16.

FIG. 2 is a perspective view illustrating the placement of the millimeter wave radar unit 15 and the light emitting unit 16. In the present embodiment, the light source 17 is composed of two separate light sources 17A, and the light guide body 18 has two light guide members 18A. Light from each light source 17A is incident upon each corresponding light guide member 18A, and each light guide member 18A can be separately controlled to emit or not to emit light.

Further, each of the light guide members 18A is configured as a light guide plate that is shaped like a parallel flat plate having a substantially constant layer thickness, and is placed such that the surface thereof is parallel to an antenna surface (electromagnetic wave radiation surface) 15S of the millimeter wave radar unit 15. Alternatively, each of the light guide members 18A may be configured as a light guide film that is inflexible (i.e., shaped like a parallel flat plate having a substantially constant layer thickness).

The light guide members 18A are formed by forming a transparent resin such as polycarbonate, acrylic, epoxy, or polyimide into a plate-like or film-like shape, and radiate light input to the end portions thereof from the light source 17.

In the case illustrated in FIG. 2, the two light guide members 18A extend in a horizontal direction (a first direction), and are placed so as to be spaced apart from the antenna surface 15S. Further, the two light guide members 18A are placed so as to be spaced apart from each other in a vertical direction (a second direction) in a plane (in the same plane) parallel to the antenna surface 15S, and configured to cover a part of the antenna surface 15S of the millimeter wave radar unit 15. The light guide body 18 may be configured to cover a part or the entire surface of the antenna surface 15S.

In other words, the light guide body 18 is composed of a plurality of light guide members, and the plurality of the light guide members extend in the horizontal direction (or the vertical direction) and are placed and arranged, being spaced apart from each other in the vertical direction (or the horizontal direction) in the plane parallel to the antenna surface 15S.

The plurality of the light guide members 18A are placed so as to be spaced apart from each other in the plane parallel to the antenna surface 15S, thus making it possible to suppress the attenuation and reflection of radar waves to a minimum and to suppress a change in an electromagnetic wave radiation pattern.

Figure 3A:
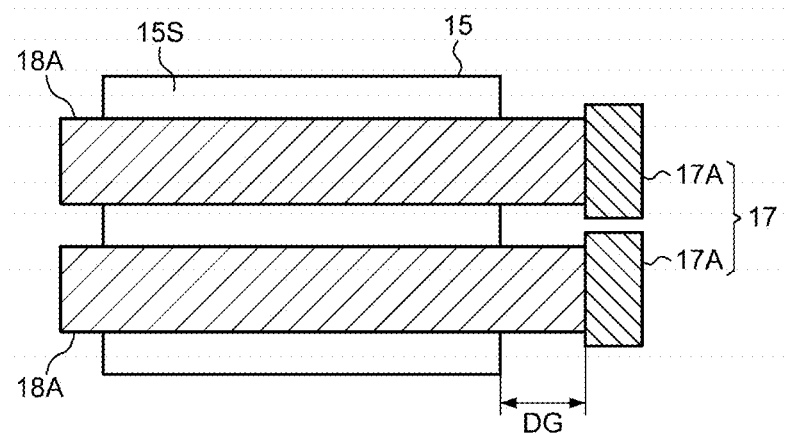
FIG. 3A is a diagram illustrating a light guide member 18A and an antenna surface 15S when viewed from the antenna surface 15S side of the millimeter wave radar unit 15.

FIG. 3A is a diagram illustrating the light guide members 18A and the antenna surface 15S viewed from the antenna surface 15S side of the millimeter wave radar unit 15. Further, FIG. 3B is a diagram schematically illustrating the sections of the millimeter wave radar unit 15 and the light guide members 18A.

Figure 3B:
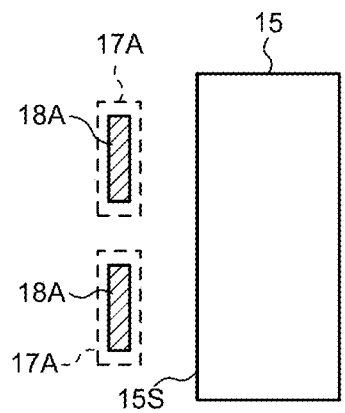
FIG. 3B is a diagram schematically illustrating the sections of the millimeter wave radar unit 15 and the light guide member 18A.

FIG. 3A and FIG. 3B illustrate the case where the light guide members 18A are separately connected to the light sources 17A, but another configuration may be applied, in which light is guided from one light source 17 to at least one light guide member 18A.

Figure 4:
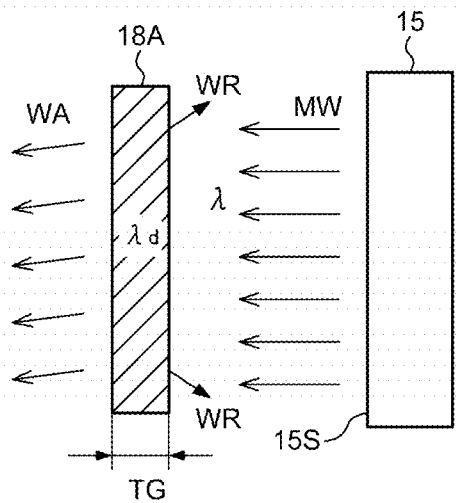
FIG. 4 schematically illustrates a millimeter wave MW (wavelength: k) radiated from the millimeter wave radar unit 15 passing through the light guide member 18A (thickness: TG)

FIG. 4 schematically illustrates a case where millimeter waves MW (wavelength k) radiated from the millimeter wave radar unit 15 pass through the light guide member 18A (thickness TG). The millimeter waves MW are partly reflected (reflection waves WR) by the light guide member 18A, and the millimeter waves passing through the light guide member 18A are attenuated by the light guide member 18A, and radiated to the outside (transmitted millimeter waves WA).

[Reflection Loss, Transmission Loss, and the Thickness of the Light Guide Member 18A]

If the difference in dielectric constant between a light guide member and air is large, then the radiated electromagnetic waves in a millimeter wave band emitted from a millimeter wave radar are reflected by the light guide member (dielectric). Further, due to the influence of the dielectric loss of the light guide member, the radiated electromagnetic waves from the millimeter wave radar are absorbed and turned into heat in the light guide member. For these reasons, if the light guide member is placed in front of the antenna surface of the millimeter wave radar, then there will be a problem in that the intensity of radiated electromagnetic waves decreases or the radiation direction of radiated electromagnetic waves (antenna pattern) inconveniently changes due to a difference in dielectric constant between the light guide member and air.

When the frequency used for a millimeter wave radar is denoted by f (Hz), a wavelength $\lambda$(m) in the space at that frequency will be as follows.

$$\lambda = c/f (c: \text{light speed}; c=3.0\times10^8 \text{ m/s})$$

For example, if the frequency f is 79 GHz, then the wavelength $\lambda$ is 3.8 mm. When the wavelength in a dielectric is denoted by $\lambda d$, and the relative permittivity of the dielectric is denoted by $\varepsilon r$, then the wavelength in the dielectric is expressed by the following.

$$\lambda d = \lambda/\varepsilon r^{1/2}$$

Further, if the wavelength in the space is 3.8 mm, and the relative permittivity of a dielectric is 2.4, then the wavelength in the dielectric is 2.45 mm.

A distance D at which the power density of radiated electromagnetic waves is halved (power halving depth) is expressed by the following in a high frequency heating field when a dielectric loss is denoted by tan $\delta$:

$$D(m) = 3.32\times10^7/(f\times\varepsilon r^{1/2}\times\tan \delta)$$

For example, when electromagnetic waves of a frequency of 79 GHz move through a dielectric having a relative permittivity of 2.4 and a dielectric loss of 0.06, the power is halved at a thickness of 4.5 mm.

The thickness at which electromagnetic waves are absorbed by a dielectric and turned into heat, and the power is halved is 4.5 mm. However, a part of the power is reflected at the interface of the dielectric due to a difference in dielectric constant between air and dielectric, so that the actual attenuation of the power coming out through the dielectric is expected to be equal to or more than a half when the thickness of the dielectric is 4.5 mm.

From the example described above, the attenuation of electromagnetic waves moving through a dielectric can be suppressed by making the dielectric used for a light guide material thinner; however, the thickness of the dielectric is ideally set to n×$\lambda d$/2 (n: natural number) to suppress the influence of reflection waves, considering the influence of reflection waves that take place at the interface of the dielectric.

A structure in which resins having different dielectric constants are laminated is used for a radome or the like in order to suppress reflection waves, but a light guide material is advantageously formed of a single dielectric, because the function of guiding light is important for a light guide member.

Thus, the thickness of a dielectric will be discussed, considering the relationship between reflection loss and transmission loss of power. The reflection loss and the transmission loss can be determined by a waveguide S parameter method or a free space S parameter method.

The thickness of a dielectric is selected as described below. When the thickness of the dielectric through which electromagnetic waves pass is denoted by TG, if a reflection loss is equal to or more than a transmission loss (reflection loss≥transmission loss), then the thickness is as shown below:

$$TG = n \times \lambda d/2 \text{ (n: natural number)}$$

If the thickness TG is set to an integer multiple of λd/2, then the transmission loss also increases, so that an integer value that satisfies the condition indicated by reflection loss≥transmission loss is preferably used.

Further, if the reflection loss is below the transmission loss (reflection loss<transmission loss), then the thickness TG of the dielectric is set to below λd/2, that is:

$$TG < \lambda d/2$$

Even if TG does not completely agree with n×λd/2 (n: natural number), no practical problem will occur if the thickness is set such that TG falls in a frequency band in which the reflection loss of power with respect to the frequency f is, for example, −10 dB or less (the reflection power being 10% or less). Such a range of the thickness TG can be derived by setting a conditional expression in which the value of a reflection loss $S_{11}$ is −10 dB or less by using, for example, an S parameter method, and obtaining a solution on the thickness TG.

$$s_{11} = \frac{\Gamma(1 - z^2)}{1 - \Gamma^2 z^2} \leq -10 \text{ dB} \tag{1}$$

where $$\Gamma = \frac{(\gamma_0 - \gamma)}{(\gamma_0 + \gamma)} \tag{2}$$

$$z = \exp(-\gamma \cdot TG) \tag{3}$$

$$\gamma_0 = j \sqrt{\left(\frac{\omega}{c_{air}}\right)^2 - \left(\frac{2\pi}{\lambda_c}\right)^2} \tag{4}$$

$$\gamma = j \sqrt{\frac{\omega^2 \varepsilon_r}{c_{vac}^2} - \left(\frac{2\pi}{\lambda_c}\right)^2} \tag{5}$$

($C_{air}$: light speed in the air; $C_{vac}$: light speed in vacuum; ω: angular frequency of electromagnetic wave (=2×π×f [Hz]); εr: complex dielectric constant of dielectric; and $\lambda_c$: cutoff wavelength (indicating upper limit of wavelength propagated by basic mode, and determining the minimum operating frequency of a transmission line. In coaxial lines, $\lambda_c = \infty$)).

Further, the range of an allowable thickness TG may be determined to be an appropriate value by experimentally evaluating the dependence of reflection loss on the thickness TG (e.g., a value at which the reflection loss is −10 dB or less). If the reflection loss is −10 dB or more, a failure of equipment may occur.

The above has described the case where the light guide member 18A is composed of a single dielectric, but when the light guide member 18A is composed of a plurality of dielectric layers, the above can be applied by replacing the relative permittivity and dielectric loss by effective values.

[Thermal Noise]

The radiation of the thermal noise generated from a heat generating section of the light source 17 (an LED, an incandescent light bulb, or the like) can be suppressed such that the thermal noise is not radiated toward the antenna of the millimeter wave radar unit 15 from the light guide member 18A by setting an interval DG between the light sources 17A and the antenna surface 15S to ten times or more of the wavelength (λ) of the electromagnetic waves radiated from the millimeter wave radar unit 15, as illustrated in FIG. 3A.

Figure 5:
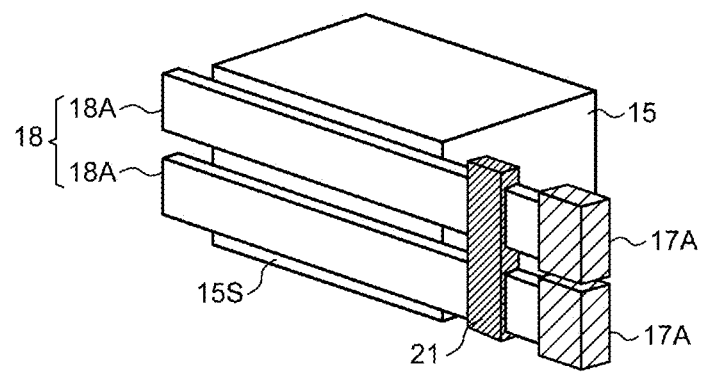
FIG. 5 is a perspective view illustrating a modified example of the configurations of light sources 17A of the light emitting unit 16 and the light guide members 18A, and also illustrating an electromagnetic wave absorber 21 that absorbs thermal noises radiated from a light source 17.

FIG. 5 is a perspective view illustrating a modified example of the configurations of the millimeter wave radar unit 15 and the light sources 17A and the light guide members 18A of the light emitting unit 16. In this modified example, an electromagnetic wave absorber 21, which absorbs the thermal noises radiated from the light source 17, is provided between the light sources 17A and the antenna surface 15S. In other words, the electromagnetic wave absorber 21 is provided on the end portions of the light guide members 18A, the end portions being adjacent to the light sources 17A. The electromagnetic wave absorber 21 preferably encloses and/or is connected (in close contact) with the light guide members 18A.

The structure is such that the thermal noise radiation in a radar frequency band is attenuated in the light guide body (the light guide members 18A), so that the reception sensitivity of the millimeter wave radar is not deteriorated. The influence exerted by thermal noises from the light source 17 can be avoided by the electromagnetic wave absorber 21, and the deterioration of the reception sensitivity of the radar is suppressed, thus enabling highly accurate radar sensing to be achieved.

For the electromagnetic wave absorber 21, a well-known material such as a resin or paint mixed with an electromagnetic wave absorbing material such as ferrite or carbon, or ceramics can be used.

[Modified Example of the Light Guide Body]

Figure 6:
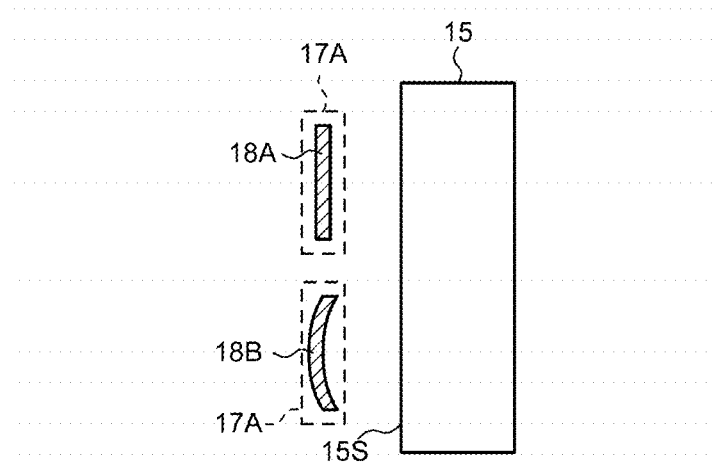
FIG. 6 is a diagram illustrating a modified example in which a light guide body 18 has a light guide member 18A and a light guide member 18B, which are different from each other.

FIG. 6 illustrates a modified example of the foregoing embodiment, in which a light guide body 18 has a light guide member 18A and a light guide member 18B that are different from each other. The light guide member 18A is a light guide body shaped like a parallel flat plate as with the one described above. The light guide member 18B is configured as a curved light guide body having a constant layer thickness. The light guide member 18B is formed by, for example, curving the light guide member 18A only in a direction (vertical direction) perpendicular to the extending direction (horizontal direction). Therefore, the light guide member 18B is the same as in FIG. 3A when viewed from the front.

Thus, the light guide body 18 is composed of a plurality of light guide members, at least one of which is configured as a curved light guide body having a constant layer thickness, and the plurality of light guide members are placed and arranged, being spaced apart from each other in a plane parallel to the antenna surface 15S. In other words, the curved light guide body is curved only in the vertical direction, and the extending direction thereof is parallel to the antenna surface 15S.

The light guide member 18A shaped like a parallel flat plate is preferable in terms of suppressing the reflection of radar waves. On the other hand, the curved light guide member 18B is preferable in forming light distribution required by law in terms of diffuse radiation of light, and is preferably used as, for example, a DRL or a turn lamp. However, the light guide member 18A shaped like a parallel flat plate and the curved light guide member 18B can be used in combination as appropriate depending on application and function. Further, the plurality of light guide members constituting the light guide body 18 may have different sizes and different shapes from each other.

Figure 7A:
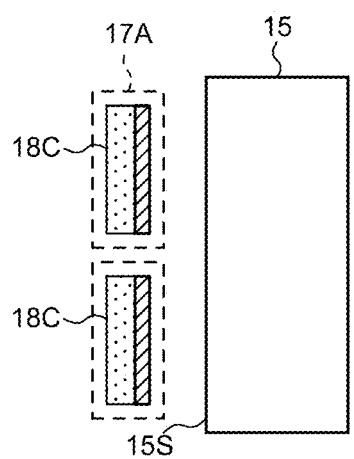
FIG. 7A is a diagram that illustrates a modified example illustrating light guide members 18C having light guide members 18A and light diffusing members 23 provided on the light guide members 18A.

FIG. 7A illustrates yet another modified example of the foregoing embodiment, in which a light guide body 18 has at least one light guide member 18C. FIG. 7A illustrates the light guide body 18 having two light guide members 18C provided in the same shape and placement as those of the light guide members 18A illustrated in FIG. 2.

Figure 7B:
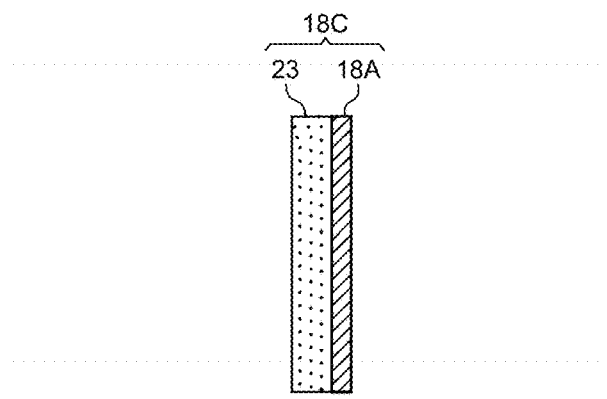
FIG. 7B is an enlarged sectional view schematically illustrating a section of the light guide member 18C in an enlarged view.

FIG. 7B is an enlarged sectional view schematically illustrating a section of the light guide member 18C in an enlarged view. The light guide member 18C has a light guide member 18A provided on the antenna surface 15S side and a light diffusing member 23 provided on the light guide member 18A.

The light diffusing member 23 is made of a foamed resin. The foamed resin is formed by sealing carbon dioxide gas or the like in a transparent resin such as polycarbonate, acrylic, polyimide, or epoxy to create bubbles in the resin. Since the gas is sealed in the resin, it is possible to reduce a dielectric constant and significantly reduce the influence on electromagnetic waves. If the foaming ratio of the foamed resin is double or more, then the influence of the resin can be almost ignored.

The same description given above applies to the light guide member 18A (thickness: TG), and if the reflection loss of the light guide member 18A is equal to or greater than the transmission loss (the reflection loss≥the transmission loss), then $TG = n \times \lambda d/2$ (n: a natural number) applies. Further, if the reflection loss is below the transmission loss (the reflection loss<the transmission loss), then the light guide member 18A has a layer thickness that satisfies $TG < \lambda d/2$.

Figure 8A:
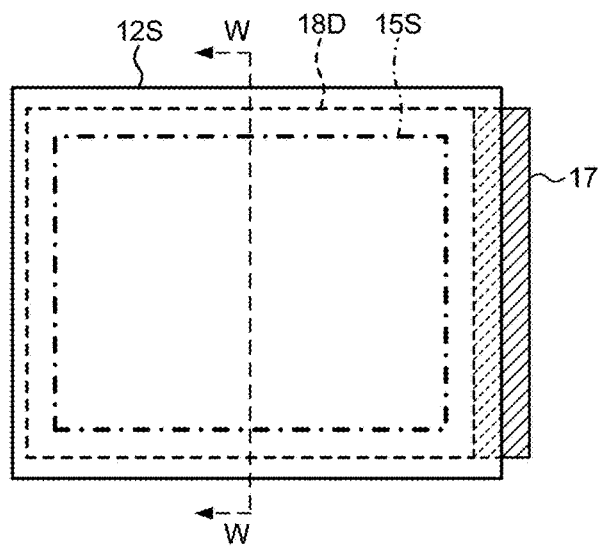
FIG. 8A is a plan view schematically illustrating the placement configuration of a millimeter wave radar unit 15, a light guide member 18D, and a transparent cover 12 in another embodiment of the present invention.

FIG. 8A is a diagram schematically illustrating the placement configuration of a millimeter wave radar unit 15, a light guide member 18D, and a transparent cover 12 in another embodiment of the present invention. This is a view from the front side (the vertical direction) of an antenna surface (a radar wave radiation surface) 15S of a transmitting/receiving antenna 15A of the millimeter wave radar unit 15.

Figure 8B:
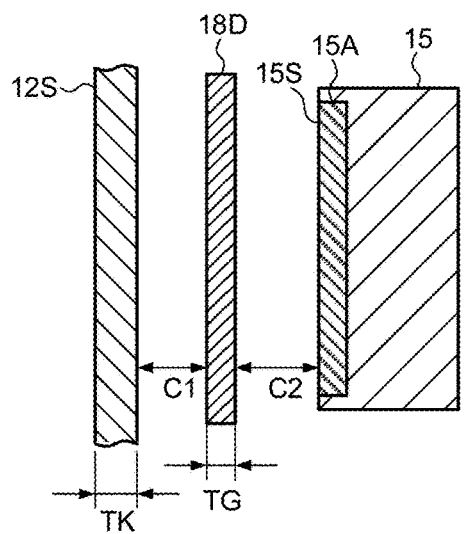
FIG. 8B is a sectional view schematically illustrating the placement configuration of the millimeter wave radar unit 15, the light guide member 18D, and the transparent cover 12 viewed from line W-W in FIG. 8A.

FIG. 8B is a sectional view schematically illustrating the placement configuration of the millimeter wave radar unit 15, the light guide member 18D, and the transparent cover 12, which are viewed from line W-W in FIG. 8A.

As illustrated in FIG. 8B, the light guide member 18D shaped like a parallel, flat plate is placed in front of the antenna surface 15S of the millimeter wave radar unit 15 with a constant interval C2 therebetween. The light guide member 18D has a thickness TG.

For example, the light guide member 18D is configured as a light guide plate having a parallel flat plate shape and a substantially constant layer thickness, and both surfaces are placed in parallel to the antenna surface 15S of the millimeter wave radar unit 15. The light guide member 18D is formed by forming a transparent resin such as polycarbonate, acrylic, epoxy, or polyimide into a plate-like shape.

Further, the light guide member 18D and the millimeter wave radar unit 15 are placed such that the interval between the light guide member 18D and the transparent cover 12 is a constant interval C1. The transparent cover 12 is formed as a cover of a transparent resin or the like that transmits visible light. The transparent cover 12 may alternatively be translucent such as being colored as long as the transparent cover 12 transmits light.

The transparent cover 12 may have a curved shape as a whole, or may have a portion having a different thickness. However, when viewed from a direction perpendicular to the antenna surface 15S (hereinafter also referred to as the vertical view), an area 12S of the transparent cover 12 (hereinafter also referred to as a radiation surface correspondence area) that overlaps the antenna surface 15S (the electromagnetic wave radiation surface) preferably has a parallel flat plate shape having a constant thickness.

As illustrated in FIG. 8A, the light guide member 18D has a light source 17 optically connected to an end portion thereof. Light is incident upon the light guide member 18D from the light source 17, and the light guide member 18D can be controlled to emit or not to emit light.

The light guide member 18D is configured to be sized and placed in such a manner as to cover the entire surface of the antenna surface 15S when viewed from a direction perpendicular to the antenna surface 15S of the millimeter wave radar unit 15.

As illustrated in FIG. 8A and FIG. 8B, the area 12S on the front of the transparent cover 12, the light guide member 18D, and the antenna surface 15S are placed in such a manner as to be parallel to each other.

The transparent cover 12 is preferably configured to be sized and placed such that the area (the radiation surface correspondence area) 12S of the transparent cover 12 that overlaps the antenna surface 15S covers the entire surface of the antenna surface 15S when viewed from the direction perpendicular to the antenna surface 15S.

[Interval Between and Thicknesses of the Light Guide Member and the Transparent Cover 12]

The light guide member 18D and the transparent cover 12 placed on the front surface side (the antenna surface 15S side) of the millimeter wave radar unit 15 are made of, for example, resins as described above, and the dielectric constants thereof cause reflection of electromagnetic waves due to a difference in dielectric constant between the resin and air at the interface between the resin and a space.

At that time, if the phase of transmitted electromagnetic waves and the phase of reflected electromagnetic waves are in directions canceling each other, then the transmitted electromagnetic waves attenuate due to the synthesis with the reflected electromagnetic waves.

More specifically, in the present specification, the frequency f of the millimeter wave radar is, for example, 76 GHz to 81 GHz. If the frequency f (Hz) is, for example, 76 GHz, then a wavelength λ (in the air) is 3.8 mm.

For example, when a relative permittivity of the transparent cover 12 (dielectric) is $\varepsilon r1 = 2.4$, the wavelength λd in the transparent cover 12 is 2.45 mm, and when a relative permittivity of the light guide member 18D is $\varepsilon r2 = 2.8$, the wavelength λd in the light guide member 18D is 2.27 mm.

The radiation surface correspondence area 12S of the transparent cover 12, the light guide member 18D, and the antenna surface 15S of the millimeter wave radar unit 15 are provided such that the relationship given below is satisfied when the thickness of the radiation surface correspondence area 12S of the transparent cover 12 is denoted by TK and the relative permittivity thereof is denoted by $\varepsilon r1$, the wavelength (effective wavelength) in a resin (medium) is denoted by $\lambda d1$, the thickness of the light guide member 18D is denoted by TG and the relative permittivity thereof is denoted by $\varepsilon r2$, and the effective wavelength in the resin (medium) is denoted by $\lambda d2$. In the following expressions, C1 denotes the interval between the radiation surface correspondence area 12S and the light guide member 18D, C2 denotes the interval between the light guide member 18D and the antenna surface 15S (electromagnetic wave radiation surface), and $n_1$, $n_2$, $m_1$, and $m_2$ denote natural numbers.

$$TK = n_1 \times \lambda d1/2$$

$$TG = n_2 \times \lambda d2/2$$

$$C1 = m_1 \times \lambda/2$$

$$C2 = m_2 \times \lambda/2$$

Thus, by appropriately selecting the thickness TK of the radiation surface correspondence area 12S and the thickness TG of the light guide member 18D, the reflection loss of electromagnetic waves that occurs at the interface between the transparent cover 12 and a space and the interface between the light guide member 18D and the space can be reduced. In other words, not only the multiple reflection between the light guide member 18D and the antenna surface 15S (electromagnetic wave radiation surface) but also the multiple reflection between the radiation surface correspondence area 12S of the transparent cover 12 and the light guide member 18D can be suppressed. Therefore, these synergistic multiple reflections can be effectively suppressed. In addition, changes in an electromagnetic wave radiation pattern can be reduced.

In other words, as described above, the lamp device of the present example can solve the problem in that the reflected electromagnetic waves between the transparent cover 12 and the light guide member 18D are further subjected to multiple reflection between the transparent cover 12 and the light guide member 18D, thus increasing noise.

Further, it is possible to solve the problem in that the reflected electromagnetic waves that have strayed into the space between the transparent cover 12 and the light guide member 18D are subjected to multiple reflection between the transparent cover 12 and the light guide member 18D, thus increasing noise.

When the thicknesses TK and TG are increased, the transmission loss increases due to the dielectric loss tangent of a resin. Preferably, therefore, $n_1 = 2$ to 4 is applied to the thickness TK, and $n_2 = 2$ or 3 is applied to the thickness TG.

Further, the radiation surface correspondence area 12S of the transparent cover 12 and the light guide member 18D may be slightly bent due to vibration from being mounted, environmental temperatures, and the like. Although the transmission and reflection characteristics are slightly changed by the bending, it is preferable that the intervals C1 and C2 are not too small in order to suppress an average characteristic change in the entire surfaces of the radiation surface correspondence area 12S and the light guide member 18D. Both the radiation surface correspondence area 12S and the light guide member 18D can be bent, so that the interval C1 is preferably larger than the interval C2 ($m_1 < m_2$).

Further, it is preferable that the intervals C1 and C2 are not too large, because reflected electromagnetic waves from other members (the extensions or the like) in the lamp device stray into the space between the intervals C1 and C2, causing noise.

Considering the above, $m_1 \geq 4$ and $m_2 \geq 2$ are preferable, and $4 \leq m_1 \leq 8$ and $2 \leq m_2 \leq 4$ are more preferable.

Even if TK, TG, C1 and C2 do not completely satisfy the relational expressions given above, multiplex reflection can be extremely effectively suppressed by setting the above to fall within a frequency band in which the reflection loss of power with respect to the frequency f is −10 dB or less (the reflected power being 10% or less).

Such a range of TK, TG, C1 and C2 can be derived by setting a conditional expression such that the value of a reflection loss $S_{11}$ is −10 dB or less by using, for example, the aforesaid S parameter method, and obtaining solutions on TK, TG, C1 and C2. The calculations can be performed by referring to the dielectric constant of each material for TK and TG, and to the dielectric constant of air for C1 and C2.

Further, the dependence of the reflection loss on TK, TG, C1 and C2 may be experimentally evaluated to determine appropriate values (e.g., values at which the reflection loss is −10 dB or less).

As described above in detail, it is possible to provide a light emitting unit and a lamp device which are capable of suppressing the attenuation and reflection of radar waves attributable to a light guide body (light guide member), do not change an electromagnetic wave radiation pattern, and do not incur the loss of a radar function.

Further, it is possible to provide a light emitting unit and a lamp device which are capable of suppressing the deterioration or the like of a radar reception sensitivity caused by thermal noise from a light source that supplies light to a light guide body.

DESCRIPTION OF REFERENCE NUMERALS

10: lamp device
11: base body
12: transparent cover
12S: radiation surface correspondence area
14: headlight unit
15: millimeter wave radar unit
15S: antenna surface
16: light emitting unit
17, 17A: light source
18: light guide body
18A, 18B, 18C: light guide member
18D: light guide member
19: extension
21: electromagnetic wave absorber
23: light diffusing member (foamed resin)

The invention claimed is:

1. A lamp device having a lighting unit and a radar device, the lamp device comprising:
    a light guide body that covers at least a part of an electromagnetic wave radiation surface of the radar device; and
    a light source that supplies light to the light guide body, wherein, in the case where a thickness of the light guide body is denoted by TG, and a wavelength of a radiated electromagnetic wave from the radar device in the light guide body is denoted by $\lambda d$, TG is set such that $TG < \lambda d/2$ is satisfied when a reflection loss of the light guide body with respect to the radiated electromagnetic wave is below a transmission loss, and a reflection loss is −10 dB or less when a reflection loss is equal to or more than a transmission loss.

2. The lamp device according to claim 1, wherein the light guide body is composed of a plurality of light guide members, and the plurality of light guide members extend in a horizontal direction and placed so as to be spaced away from each other in a vertical direction in a plane parallel to the electromagnetic wave radiation surface of the radar device, or the plurality of light guide members extend in a vertical direction and placed so as to be spaced away from each other in a horizontal direction in a plane parallel to the electromagnetic wave radiation surface of the radar device.

3. The lamp device according to claim 2, wherein at least one of the plurality of light guide members is configured as a curved light guide body having a constant layer thickness, and the plurality of light guide members are placed and arranged, being spaced apart from each other in a plane parallel to the electromagnetic wave radiation surface of the radar device.

4. The lamp device according to claim 1, wherein an interval between the light source and the electromagnetic wave radiation surface of the radar device is 10 times or more of a wavelength of the radiated electromagnetic wave.

5. The lamp device according to claim 1, wherein the light guide body has an electromagnetic wave absorber provided between the light source and the electromagnetic wave radiation surface of the radar device.

6. The lamp device according to claim 1, wherein a light diffusing member made of a foamed resin is provided on the light guide body.

7. A light emitting unit comprising:
a light guide body that is placed in front of an electromagnetic wave radiation surface of a radar device and configured to cover at least a part of the electromagnetic wave radiation surface; and
a light source that supplies light to the light guide body, wherein, in the case where a thickness of the light guide body is denoted by TG, and a wavelength of a radiated electromagnetic wave from the radar device in the light guide body is denoted by $\lambda d$, TG is set such that TG=n×$\lambda d$/2 (n being a natural number) is satisfied when a reflection loss of the light guide body with respect to the radiated electromagnetic wave is equal to or more than a transmission loss, and a reflection loss is −10 dB or less when a reflection loss is equal to or more than a transmission loss.

8. The light emitting unit according to claim 7, wherein the light guide body is composed of a plurality of light guide members, and the plurality of light guide members extend in a first direction in the same plane and are placed so as to be spaced away from each other in a second direction perpendicular to the first direction.

9. The light emitting unit according to claim 7, wherein the light guide body has an electromagnetic wave absorber provided on an end portion thereof that is adjacent to the light source.

10. The light emitting unit according to claim 7, wherein a foamed resin material is provided on the light guide body.

11. A lamp device having a lighting unit and a radar device that radiates an electromagnetic wave, and a light-transmitting cover, the lamp device comprising:
a light guide body that is placed between the light-transmitting cover and an electromagnetic wave radiation surface of the radar device and covers at least a part of the electromagnetic wave radiation surface of the radar device; and
a light source that supplies light to the light guide body, wherein a radiation surface correspondence area, which is an area of the light-transmitting cover overlapping the electromagnetic wave radiation surface as viewed from a direction perpendicular to the electromagnetic wave radiation surface, the light guide body, and the electromagnetic wave radiation surface are placed in such a manner as to be parallel to each other,
the radiation surface correspondence area of the light-transmitting cover and the light guide body are configured to be sized and placed to cover the entire surface of the electromagnetic wave radiation surface as viewed from a direction perpendicular to the electromagnetic wave radiation surface,
a thickness TK of the radiation surface correspondence area of the light-transmitting cover is set such that a reflection loss of the electromagnetic wave incident upon the radiation surface correspondence area of the light-transmitting cover is −10 dB or less,
a thickness TG of the light guide body is set such that a reflection loss of the electromagnetic wave incident upon the light guide body is −10 dB or less, and
an interval C1 between the radiation surface correspondence area and the light guide body is set such that a reflection loss of the electromagnetic wave incident upon the radiation surface correspondence area and the light guide body is −10 dB or less.

12. The lamp device according to claim 11, wherein an interval C2 between the light guide body and the electromagnetic wave radiation surface is set such that a reflection loss of the electromagnetic wave incident upon the light guide body from a space between the light guide body and the electromagnetic wave radiation surface is −10 dB or less.

13. The lamp device according to claim 12, wherein the radiation surface correspondence area, the light guide body, and the electromagnetic wave radiation surface are provided such that TK, TG, C1 and C2 satisfy a relational expression given below when a wavelength of the electromagnetic wave in a space is denoted by $\lambda$, an effective wavelength in the radiation surface correspondence area is denoted by $\lambda d1$, and an effective wavelength in the light guide body is denoted by $\lambda d2$ ($n_1$, $n_2$, $m_1$, and $m_2$ being natural numbers):

$$TK = n_1 \times \lambda d1/2$$

$$TG = n_2 \times \lambda d2/2$$

$$C1 = m_1 \times \lambda/2$$

$$C2 = m_2 \times \lambda/2.$$

14. The lamp device according to claim 13, wherein the $n_1$ satisfies $n_1$=2 to 4 and the $n_2$ satisfies $n_2$=2 or 3.

15. The lamp device according to claim 13, wherein the $m_1$ and $m_2$ satisfy $m_1 \geq 4$ and $m_2 \geq 2$.

* * * * *